Patented May 30, 1950

2,509,453

UNITED STATES PATENT OFFICE 2,509,453

PREPARATION OF BENZOTHIAZOLES

William F. Russell, Norwalk, Conn., assignor to R. T. Vanderbilt Company, Inc., New York, N. Y., a corporation of New York No Drawing. Application April 2, 1947, Serial No. 738,913

6 Claims. (Cl. 260—304)

I have discovered a novel and simple method of making thiazoles, particularly benzothiazole, in good yield and with good economy. Essentially, my new method comprises the oxidation with hydrogen peroxide of the sodium salt of a 2-mercaptothiazole such as 2-mercaptobenzothiazole in aqueous solution, the molar ratio of hydrogen peroxide:sodium salt being 2:1.

In carrying out a particularly advantageous embodiment of my invention, I react hydrogen peroxide with the sodium salt of 2-mercaptobenzothiazole in aqueous solution in the molar ratio of 2:1 while keeping the reaction mixture at a moderate temperature, say not over about 50° C. On prolonged standing, benzothiazole will separate from such reaction mixtures as a yellow oil. Liberation of the benzothiazole is promoted by the addition of sulfuric acid in the molar ratio sulfuric acid:sodium salt of 2-mercaptobenzothiazole of 1:2. Following such acidification, it is advantageous to make the reaction mixture alkaline, for example, with sodium hydroxide or with ammonia, before separation of the benzothiazole since benzothiazole is somewhat soluble in dilute mineral acids and since this step tends to maintain in solution in the aqueous reaction mixture any unreacted sodium salt of 2-mercaptobenzothiazole. After separation from the aqueous reaction mixture, the liberated benzothiazole can be purified, for example by vacuum distillation.

The reactions involved in carrying out my invention appear to be unique and contrary to the known reactions involved in the oxidation of mercaptans. For example, thiophenyl and octyl mercaptan subjected to oxidation with hydrogen peroxide in alkaline solution, and 2-mercaptobenzothiazole subjected to oxidation with hydrogen peroxide in acid solution yield disulfides, as follows:

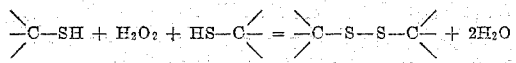

Instead of a disulfide, a sulfonic acid may be formed. Usually, the bond between the sulfur and the carbon is not broken by such oxidation reactions. However, the sodium salt of 2-mercaptobenzothiazole subjected to oxidation with hydrogen peroxide in aqueous solution yields benzothiazole, as follows:

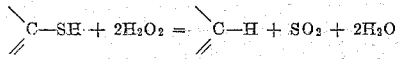

This reaction appears to be peculiar to 2-mercaptothiazoles such as 2-mercaptobenzothiazole and its substitution derivatives. The sodium salt of 2-mercaptobenzothiazole subjected to oxidation with other oxidizing agents, sodium persulfate, sodium dichromate and sodium hypochlorite, for example, yields the disulfide.

In carrying out my invention, the sulfur-carbon bond is split and the sulfur is removed as sulfur dioxide. It seems probable that the sodium salt of 2-mercaptobenzothiazole is first converted into the sodium salt of benzothiazyl sulfinic acid, as follows:

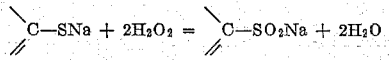

and that this compound undergoes decomposition with the formation of sulfur dioxide and sodium sulfate and the liberation of benzothiazole, as follows:

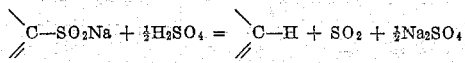

However, my claims are premised upon the observed result, my discovery, and not upon this or any other explanation of the result.

The following specific example will illustrate my invention: 227 grams of the sodium salt of 2-mercaptobenzothiazole are dissolved in 977 cubic centimeters of water. This solution may be formed by dissolving 2-mercaptobenzothiazole in an aqueous solution of sodium hydroxide. The aqueous solution of the sodium salt of 2-mercaptobenzothiazole is charged into a 3 liter glass beaker partially immersed in cooling water. 292 grams of aqueous hydrogen peroxide, 30% $H_2O_2$ diluted with 200 cubic centimeters of water are run into the solution in the beaker, with continuous stirring, over a period of 75 minutes, while maintaining the temperature of the reaction mixture between 35° and 40° C. The reaction mixture is then permitted to stand for 15 minutes. 59 grams of concentrated sulfuric acid, 93.5% $H_2SO_4$ or higher, are then run into the solution, with continuous stirring, over a period of about 15 minutes while maintaining a temperature below about 50° C. Sulfur dioxide is liberated and benzothiazole is liberated as a yellow oil which settles in the beaker. The reaction mixture is then made slightly alkaline with sodium hydroxide or ammonia. The crude benzothiazole is recovered in a yield of about 90% of the theoretical. After separation by decantation, for example, the crude benzothiazole is dried, for example with sodium sulfate or sodium carbonate, and is then purified by vacuum distillation. The pure benzothiazole, recovered as the distillate, is a clear but highly refractive oil boiling at 133°–134° C. under 12–15 millimeters of mercury absolute pressure and at 233°–235° C. at atmospheric pressure. A small amount of benzothiazole may be recovered from the aqueous mixture decanted from the crude benzothiazole by extraction with benzene, naphtha or ether. The pure benzothiazole is recovered in a yield upwards of about 80% of the theoretical.

My invention is generally useful for making benzothiazole and its substitution derivatives formed by reacting hydrogen peroxide with the sodium salt of the corresponding 2-mercaptobenzothiazole in aqueous solution in the molar ratio of 2:1 as described. For example, from 5-chloro-2-mercaptobenzothiazole I thus make 5-chlorobenzothiazole, a crystalline, volatile product which melts at 108°–109° C. The primary products of my method applied to such substitution derivatives sometimes include minor proportions of disulfides, for example, 5-chlorobenzothiazyl disulfide with 5-chlorobenzothiazole.

In referring to the sodium salt of 2-mercaptobenzothiazole, I refer to the compound illustrated by the following type formula, the numbers identifying the substituent positions:

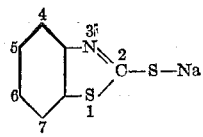

2-mercaptobenzothiazole and its sodium salt are readily available at low cost. The only present method for making benzothiazole of any consequence involves reacting o-aminothiophenol with formic acid. o-Aminothiophenol is difficult and costly to prepare. My invention, by providing an entirely new approach, thus makes important economies available.

My invention is also useful for making thiazole and substituted thiazoles other than benzothiazoles, particularly derivatives formed by substitution of alkyl and aryl groups in the 4 and 5 positions. For example, from the sodium salt of 2-mercapto-4-phenylthiazole I obtain 4-phenylthiazole, an oil which crystallizes and which melts at 55° C. Again, from the sodium salt of 2-mercapto, 4,5-dimethylthiazole I obtain 4,5-dimethylthiazole, an oil which boils at 158°–160° C. The process is the same, that is reacting hydrogen peroxide with the sodium salt of the corresponding 2-mercaptothiazole in aqueous solution in the molar ratio of 2:1.

In referring to thiazole and substituted thiazoles, I refer to compounds illustrated by the following type formula, the numbers identifying the substituent positions:

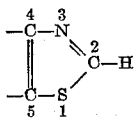

The method of my invention is thus generally useful for making thiazoles including substituted thiazoles and benzothiazole and substituted benzothiazoles where the corresponding 2-mercaptothiazole or 2-mercaptobenzothiazole is available. My invention is the described method, reacting hydrogen peroxide with the sodium salt of a 2-mercaptothiazole of the several stated classes in aqueous solution in the molar ratio of 2:1, and I do not claim any particular product of my method as part of this invention.

I claim:

1. The method of making benzothiazole which comprises reacting hydrogen peroxide with the sodium salt of 2-mercaptobenzothiazole in aqueous solution in the molar ratio of 2:1, while maintaining a moderate temperature not over about 50° C., adding sulfuric acid in the molar ratio of 1:2 and separating the liberated benzothiazole from the aqueous reaction mixture while maintaining a moderate temperature not over about 50° C.

2. The method of making benzothiazole which comprises reacting hydrogen peroxide with the sodium salt of 2-mercaptobenzothiazole in aqueous solution in the molar ratio of 2:1, while maintaining a moderate temperature not over about 50° C., adding sulfuric acid in the molar ratio of 1:2, making the reaction mixture alkaline and separating the liberated benzothiazole from the aqueous reaction mixture while maintaining a moderate temperature not over about 50° C.

3. The method of making benzothiazole and its benzene ring substitution derivatives which are free from groups which are oxidized by hydrogen peroxide, which comprises reacting hydrogen peroxide with the sodium salt of the corresponding 2-mercaptobenzothiazole in aqueous solution in the molar ratio of 2:1 while maintaining a moderate temperature not over about 50° C., adding sulfuric acid in the molar ratio of 1:2 and separating the product from the aqueous reaction mixture.

4. The method of making benzothiazole and its benzene ring substitution derivatives which are free from groups which are oxidized by hydrogen peroxide, which comprises reacting hydrogen peroxide with the sodium salt of the corresponding 2-mercaptobenzothiazole in aqueous solution in the molar ratio of 2:1 while maintaining a moderate temperature not over about 50° C., adding sulfuric acid in the molar ratio of 1:2, making the reaction mixture alkaline and separating the liberated benzothiazole from the aqueous reaction mixture.

5. The method of making benzothiazole and derivatives thereof which contain as the sole substituents in the benzene ring at least one substituent selected from the group consisting of chlorine and alkyl and aryl radicals, which comprises reacting hydrogen peroxide with the sodium salt of the corresponding 2-mercaptobenzothiazole in aqueous solution in the molar ratio of 2:1 while maintaining a moderate temperature not over about 50° C., adding sulfuric acid in the molar ratio of 1:2 and separating the liberated benzothiazole from the aqueous reaction mixture.

6. The method of making benzothiazole and derivatives thereof which contain as the sole substituents in the benzene ring at least one substituent selected from the group consisting of chlorine and alkyl and aryl radicals, which comprises reacting hydrogen peroxide with the sodium salt of the corresponding 2-mercaptobenzothiazole in aqueous solution in the molar ratio of 2:1 while maintaining a moderate temperature not over about 50° C., adding sulfuric acid in the molar ratio of 1:2, making the reaction mixture alkaline and separating the product from the aqueous reaction mixture.

WILLIAM F. RUSSELL.

REFERENCES CITED

The following references are of record in the file of this patent:

UNITED STATES PATENTS

| Number | Name | Date |
|---|---|---|
| 2,179,984 | Spiegelberg | Nov. 14, 1939 |
| 2,179,987 | Van Duzee | Nov. 14, 1939 |

OTHER REFERENCES

Buchman et al., Jour. Org. Chem., vol. 6, 1941, pages 764–773.

Certificate of Correction

Patent No. 2,509,453 May 30, 1950

WILLIAM F. RUSSELL

It is hereby certified that errors appear in the printed specification of the above numbered patent requiring correction as follows:

Column 3, line 75, to column 4, line 2, and column 4, lines 11 and 12, strike out "while maintaining a moderate temperature not over about 50° C.";

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*